United States Patent
Chang

(10) Patent No.: US 11,659,479 B2
(45) Date of Patent: May 23, 2023

(54) NETWORK ACCESSING METHOD AND COMMUNICATIONS APPARATUS UTILIZING THE SAME

(71) Applicant: MEDIATEK INC., Hsin-Chu (TW)

(72) Inventor: Hung-Lin Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/402,641

(22) Filed: Aug. 16, 2021

(65) Prior Publication Data

US 2023/0048517 A1 Feb. 16, 2023

(51) Int. Cl.
*H04W 4/00* (2018.01)
*H04W 48/16* (2009.01)
*H04W 48/08* (2009.01)

(52) U.S. Cl.
CPC ........... *H04W 48/16* (2013.01); *H04W 48/08* (2013.01)

(58) Field of Classification Search
CPC ..... H04W 48/16; H04W 48/08; H04W 48/18; H04W 48/20; H04W 48/12; H04W 88/06
USPC ....................................................... 455/434
See application file for complete search history.

(56) References Cited

U.S. PATENT DOCUMENTS

| 8,817,644 | B2 | 8/2014 | Etemad | |
|---|---|---|---|---|
| 2013/0023267 | A1* | 1/2013 | Ong | H04W 48/10 |
| | | | | 455/435.1 |
| 2013/0203452 | A1 | 8/2013 | Awoniyi | |
| 2020/0389828 | A1* | 12/2020 | Venkataraman | H04W 36/14 |
| 2021/0022171 | A1 | 1/2021 | Zacharias | |
| 2021/0045147 | A1* | 2/2021 | Zhou | H04L 5/0098 |
| 2021/0067977 | A1 | 3/2021 | Martin | |
| 2021/0144522 | A1* | 5/2021 | Lee | H04W 4/20 |
| 2021/0168700 | A1* | 6/2021 | Chen | H04W 48/16 |
| 2021/0227563 | A1* | 7/2021 | Xu | H04W 72/042 |

* cited by examiner

*Primary Examiner* — Temica M Beamer
(74) *Attorney, Agent, or Firm* — Winston Hsu

(57) ABSTRACT

A network accessing method includes performing a cell search procedure for a first RAT; receiving first SI from a first cell of the first RAT when the first cell has been found in the cell search procedure; determining whether second SI is scheduled by the first cell according to content of the first SI; receiving the second SI in response to determination of the second SI being scheduled and deriving information regarding a second cell of a second RAT different from the first RAT; searching for the second cell according to the information regarding the second cell; and attempting to access the second cell instead of the first cell when the second cell has been found. The first cell is configured to provide access to a first core network and the second cell is configured to provide access to a second core network different from the first core network.

20 Claims, 4 Drawing Sheets

NETWORK ACCESSING METHOD AND COMMUNICATIONS APPARATUS UTILIZING THE SAME

BACKGROUND

The fifth generation (5G) communication standard is the next generation communication standard of the fourth generation (4G), such as the LTE (Long Term Evolution) and LTE-Advanced. One purpose of the new radio (NR) access technology in the fifth generation is to realize tight interworking between the LTE system and the LTE-Advanced system and the NR system. As a technology candidate for realizing this close cooperation, dual connectivity by an LTE system or an LTE-Advanced system (hereinafter referred to as an LTE system) and an NR system is considered.

In Evolved Universal Terrestrial Radio Access (EUTRA)-NR Dual Connectivity (EN-DC), LTE would become a Master Cell Group (MCG) and NR would become a Secondary Cell Group (SCG). MCG works as the anchor and User Equipment (UE) performs initial registration to this anchor cell group, and this anchor cell adds one or more secondary cells. Therefore, for NR non-standalone (NSA) mode, UE camps on LTE cell first and wait for the network to configure EN-DC on NR cell. On the other hand, for standalone (SA) mode, UE can directly camp on NR cell during idle mode.

For users with multi-RAT (Radio Access Technology) supported UE, they usually expect that UE shall be able to search the most preferred RAT first. For example, when UE powers on in an environment with 5G coverage, it is expected that UE register on 5G first. However, the network deployment usually varies from location to location, and from time to time. For example, the operators usually start the network deployment for new RAT (e.g. 5G) from primary cities first, and the network deployment in the secondary cities may be completed after several years. For this reason, it is hard for the UE to have a whole picture of the network deployment in current location, especially for the scenario when the UE just powers on or move into a location that the UE has never visited before.

As 5G has become more and more popular, users prefer to use 5G service rather than legacy RAT such as LTE, Universal Mobile Telecommunications System (UMTS) or Global System for Mobile (GSM). Therefore, an efficient network access method for facilitating a communications apparatus or an UE, especially a communications apparatus or an UE operating in SA mode, to access to a wireless network of the most or the more preferred RAT is highly required.

SUMMARY

It is an objective of the invention to provide an efficient network access method for facilitating an UE, especially an UE operating in SA mode, to access to a wireless network of the most or the more preferred RAT.

According to an embodiment of the invention, a communications apparatus comprises a radio transceiver transmitting or receiving wireless signals in a wireless network and a processor, coupled to the radio transceiver and configured to perform operations comprising: performing a cell search procedure for a first Radio Access Technology (RAT) in the wireless network; receiving first system information from a first cell of the first RAT based on a search result indicating that the first cell has been found in the cell search procedure for the first RAT; determining whether second system information is scheduled by the first cell according to content of the first system information; receiving the second system information based on determination of the second system information being scheduled by the first cell and deriving information regarding a second cell of a second RAT different from the first RAT based on the second system information; searching for the second cell of the second RAT according to the information regarding the second cell of the second RAT; and attempting to access the second cell instead of the first cell based on a search result indicating that the second cell has been found in the search for the second cell of the second RAT. The first cell is configured to provide access to a first core network and the second cell is configured to provide access to a second core network different from the first core network.

According to another embodiment of the invention, a network accessing method comprises performing a cell search procedure for a first RAT; receiving first system information from a first cell of the first RAT based on a search result indicating that the first cell has been found in the cell search procedure for the first RAT; determining whether second system information is scheduled by the first cell according to content of the first system information; receiving the second system information based on determination of the second system information being scheduled by the first cell and deriving information regarding a second cell of a second RAT different from the first RAT based on the second system information; searching for the second cell of the second RAT according to the information regarding the second cell of the second RAT; and attempting to access the second cell instead of the first cell based on a search result indicating that the second cell of the second RAT has been found in the search for the second cell of the second RAT. The first cell is configured to provide access to a first core network and the second cell is configured to provide access to a second core network different from the first core network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
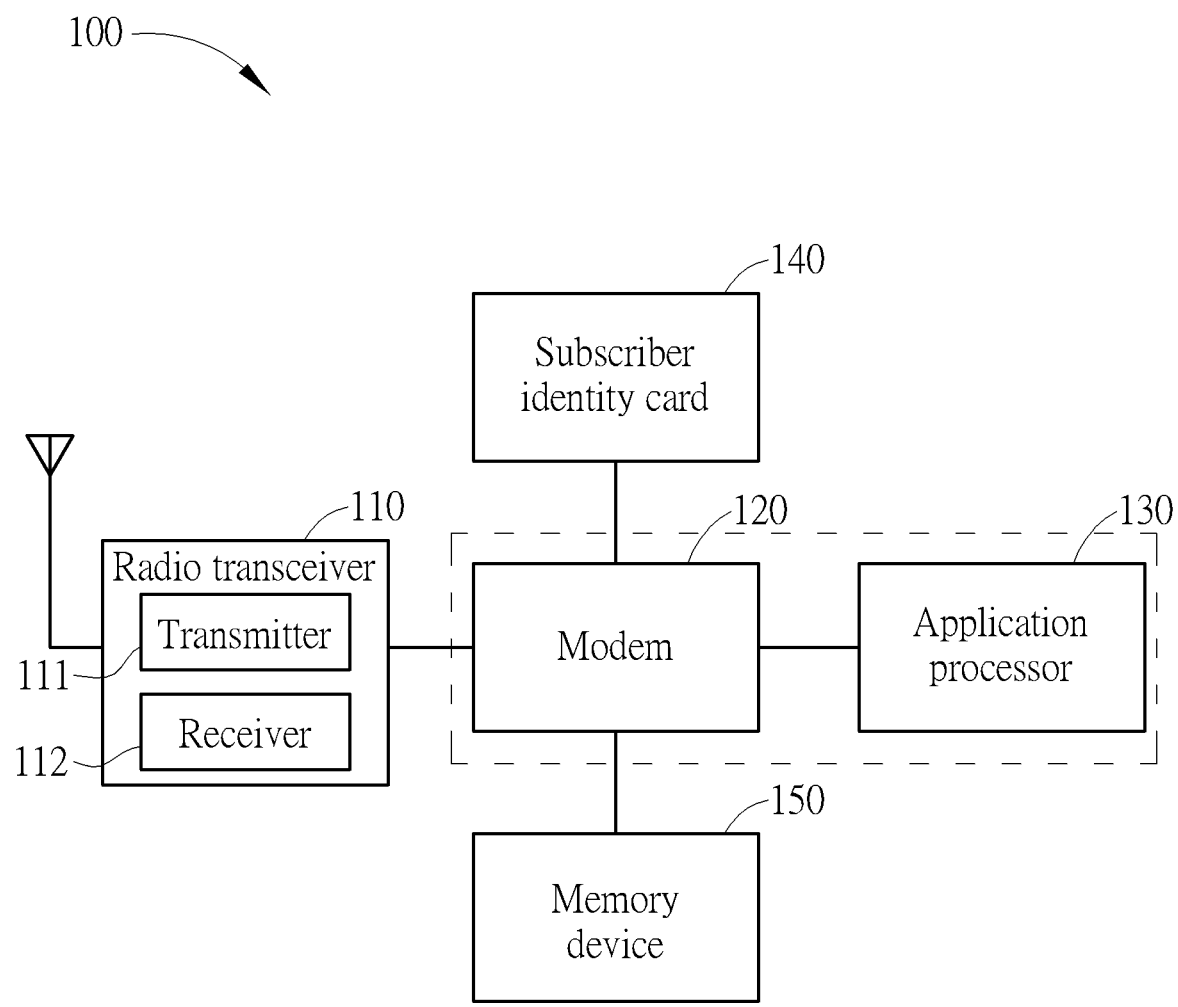
FIG. 1 shows an exemplary block diagram of a communications apparatus according to an embodiment of the invention.

FIG. 1 shows an exemplary block diagram of a communications apparatus according to an embodiment of the invention. The communications apparatus 100 may be a portable electronic device, such as a Mobile Station (MS, which may be interchangeably referred to as User Equipment (UE)). The communications apparatus 100 may comprise at least an antenna module comprising at least one antenna, a radio transceiver 110, a modem 120, an application processor 130, a subscriber identity card 140, and a memory device 150. The radio transceiver 110 is configured to transmit or receive wireless signals in a wireless network. The radio transceiver 110 may comprise a receiver 112 configured to receive wireless signals from an air interface via the antenna module and a transmitter 111 configured to transmit wireless signals to the air interface via the antenna module, and the radio transceiver 110 may be configured to perform RF signal processing. For example, the receiver 112 may convert the received signals into intermediate frequency (IF) or baseband signals to be processed, or transmitter 111 may receive the IF or baseband signals from the modem 120 and convert the received signals into wireless signals to be transmitted to a network device in the wireless network (e. g. an access network such as a cellular network or a wireless local access network). According to an embodiment of the invention, the network device may be a cell, a node B, an evolved node B (eNB), a g node B (gNB), a base station, a Mobility Management Entity (MME), an Access and Mobility Management Function (AMF) device, an access point (AP), etc., at the network side and communicating with the communications apparatus 100 via the wireless signals.

The transmitter 111 and the receiver 112 of the radio transceiver 110 may comprise a plurality of hardware devices to perform radio frequency (RF) conversion and RF signal processing. For example, the transmitter 111 and/or the receiver 112 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a LTE system, or the frequency of any specific frequency band for a 5G NR system, the frequency of any specific frequency band for a WiFi system, etc.

The modem 120 may be configured to handle corresponding communications protocol operations and processing the IF or baseband signals received from or to be transmitted to the radio transceiver 110. The application processor 130 is configured to run the operating system of the communications apparatus 100 and run application programs installed in the communications apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM card, a USIM card, a R-UIM card, a CSIM card, an embedded SIM (eSIM) card, or the profile of an Embedded Universal Integrated Circuit Card (eUICC), an integrated SIM (iSIM) card, an integrated Universal Integrated Circuit Card (iUICC), or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communications apparatus may further comprise some peripheral devices not shown in FIG. 1. In another example, in some embodiments of the invention, the communications apparatus may further comprise a central controller coupled to the modem 120 and the application processor 130. Therefore, the invention should not be limited to what is shown in FIG. 1.

In some embodiments of the invention, the communications apparatus is capable of supporting multiple radio access technologies (RATs) communications via the single-card structure as shown in FIG. 1. It should be noted that, although FIG. 1 shows a single-card application, the invention should not be limited thereto. For example, in some embodiments of the invention, the communications apparatus may comprise multiple subscriber identity cards to support the multi-RATs communications, in either a single-standby or a multiple-standby manner. In the multi-RATs communications applications, the modem, the radio transceiver and/or the antenna module may be shared by the subscriber identity card(s) and may have the capability of handling the operations of different RATs and processing the corresponding RF, IF or baseband signals in compliance with the corresponding communications protocols.

In addition, those who are skilled in this technology can still make various alterations and modifications based on the descriptions given above to derive the communications apparatuses comprising multiple radio transceivers and/or multiple antenna modules for supporting multi-RAT wireless communications without departing from the scope and spirit of this invention. Therefore, in some embodiments of the invention, the communications apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be individual identifiers, numbers, addresses, or the like which are burned in the internal memory device of the corresponding modem and are capable of identifying the communications apparatus. Therefore, the invention should not be limited to what is shown in the figures.

It should be further noted that in some embodiments of the invention, the communications apparatus may further support multiple IMSIs.

Figure 2:
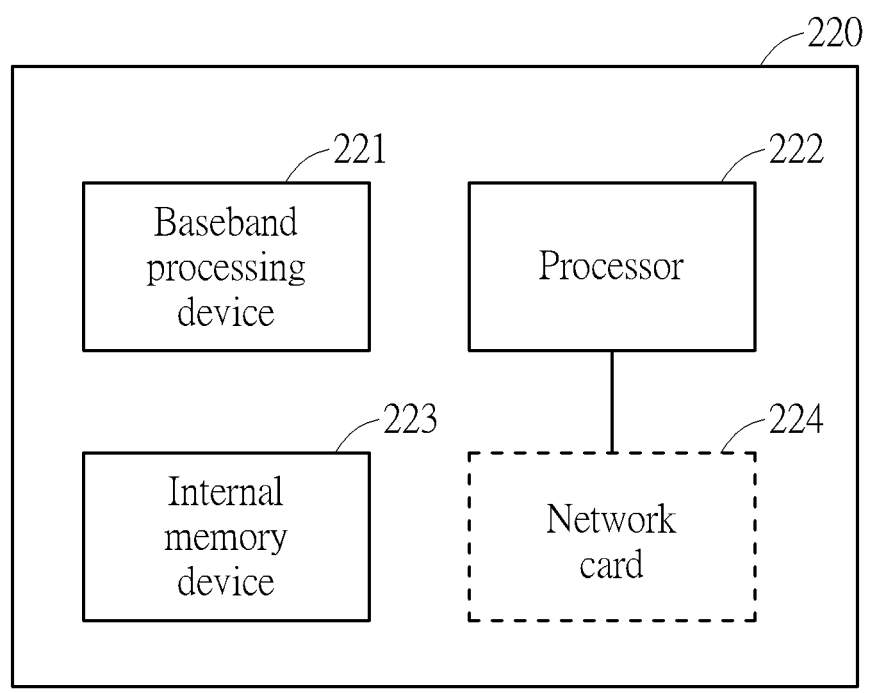
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In an embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140, and write data to the subscriber identity card. The internal memory device 223 may store system data and user data for the modem 220. The processor 222 may also access the internal memory device 223.

The network card 224 provides Internet access services for the communications apparatus. It should be noted that, although the network card 224 shown in FIG. 2 is configured inside of the modem, the invention should not be limited thereto. In some embodiments of the invention, the communications apparatus may also comprise a network card configured outside of the modem, or the communications apparatus may also be coupled to an external network card for providing Internet access services. In some embodiments of the invention, the network card 224 may be a virtual network card, instead of a tangible card, that is created by the operating system of the communications apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem may also comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the processor 222 may be integrated into one processing unit, and the modem may comprise one or multiple such processing units, for supporting multi-RAT operations. Therefore, the invention should not be limited to what is shown in FIG. 2.

According to an embodiment of the invention, the processor 222 may comprise a plurality of logics, each designed for handling one or more functionalities. The logics may be configured to execute the program codes of one or more software and/or firmware modules, thereby performing the corresponding operations. When performing the corresponding operations by executing the corresponding programs, the logics may be regarded as dedicated hardware devices or circuits, such as dedicated processor sub-units.

Generally, when the communications apparatus 100 enters a wireless network, for example, when the communications apparatus 100 is supplied with power and powers on, the communications apparatus 100 may first perform a cell search and a cell selection procedure to find out a cell of a predetermined RAT and synchronize time and frequency with that cell and attempt to access that cell when some predefined conditions are satisfied, where the operations of "accessing one cell" may at least comprise the operations of camping on and registering to the cell. When the attempt of accessing one cell is successful, the communications apparatus 100 registers on that cell and is able to use the wireless communications services provided by that cell, such as receiving a paging or a mobile terminated (MT) call from that cell.

In the embodiments of the invention, efficient network access methods for facilitating the communications apparatus 100 to access to a wireless network of the most or the more preferred RAT are proposed. Here, the most or the more preferred RAT may be the RAT set in subscriber identity card 140, configured by the network device, or set by the communications apparatus 100 with the highest or the higher preference. For instance, the most preferred RAT may be the most advanced RAT at the time when the communications apparatus 100 is manufactured. For example, the RAT preference or RAT priority set in the subscriber identity card 140 or configured by the network device may be 5G>4G>3G. Therefore, when the communications apparatus 100 powers on, the communications apparatus 100 may be configured to perform a cell search procedure for searching a 5G cell first, then perform a cell search procedure for searching a 4G cell when no 5G cell has been found, and then perform a cell search procedure for searching a 3G cell when no 4G cell has been found. In the embodiments of the invention, the RAT preference or RAT priority may also be determined based on the selection priority, the data throughput or data/voice service capability, or data/voice service quality of the RATs supported by the communications apparatus 100.

Figure 3:
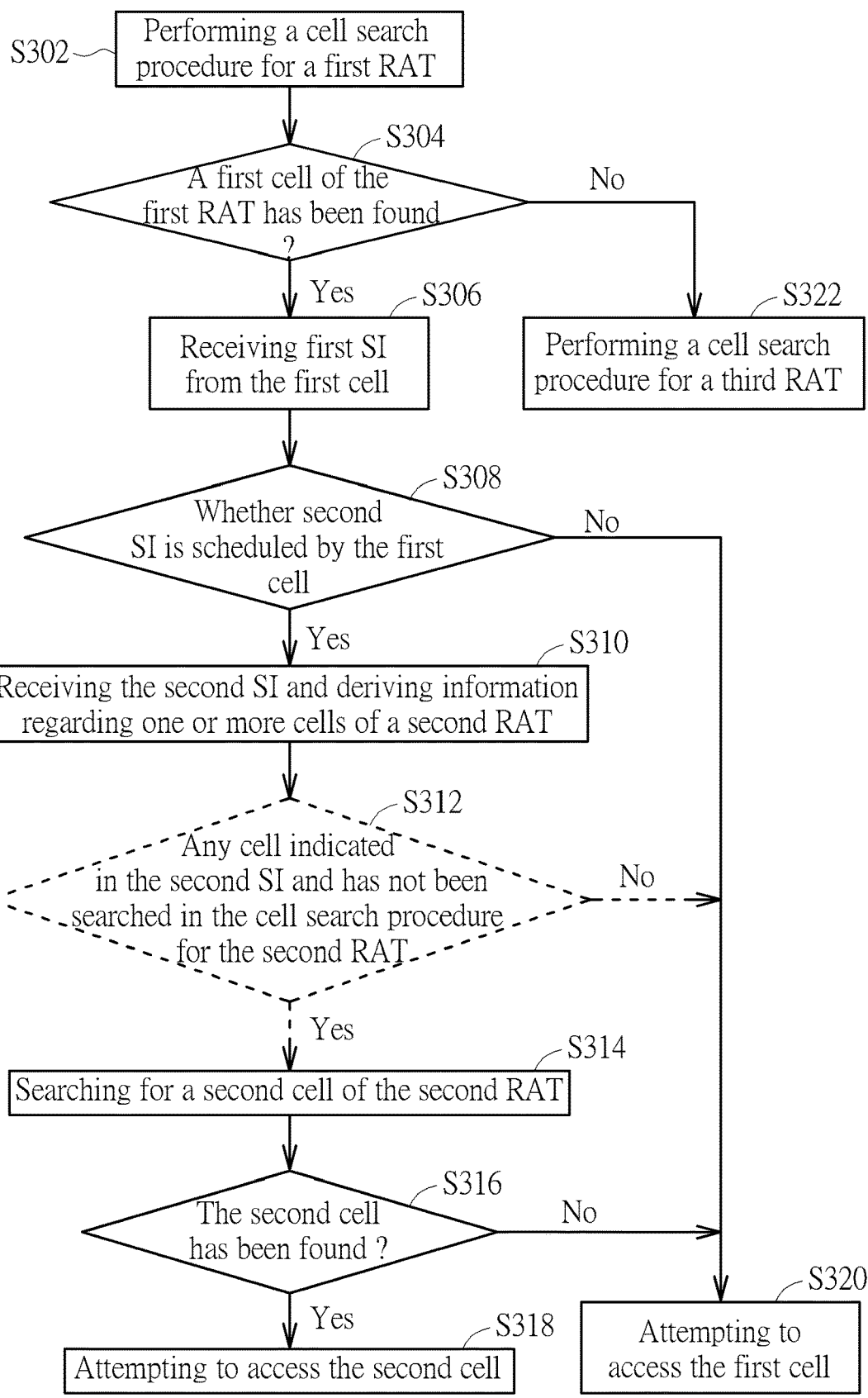
FIG. 3 illustrates an exemplary flow chart of a network accessing method according to a first embodiment of the invention.

FIG. 3 illustrates an exemplary flow chart of a network accessing method according to a first embodiment of the invention. The network accessing method may be performed by the processor 222 and may comprise the following steps:

Step S302: Performing a cell search procedure for a first RAT. In the embodiment of the invention, the first RAT may be a RAT different from the most preferred RAT of the communications apparatus 100, or may be a less preferred RAT when there is a more preferred RAT. For example, when the most preferred RAT of the communications apparatus 100 is set to 5G, the first RAT may be 4G. In addition, in the embodiment of the invention, before performing step S302, the processor 222 may be further configured to perform a cell search procedure for a second RAT, and step S302 will be performed when no cell of the second RAT has been found in the cell search procedure for the second RAT. In the embodiment of the invention, the second RAT may be a RAT that is different from the first RAT and more preferred than the first RAT. For example, the second RAT may be 5G, which may also be the most preferred RAT of the communications apparatus 100.

Step S304: Determining whether a cell of the first RAT has been found in the cell search procedure for the first RAT. If no cell of the first RAT has been found, step S322 is performed. If any cell, for example, a first cell, of the first RAT has been found (that is, based on a search result indicating that a first cell has been found in the cell search procedure for the first RAT), step S306 is performed.

Step S306: Receiving first system information (SI) from the first cell of the first RAT. In an embodiment of the invention, the first system information may at least comprise System Information Block (SIB) 1 broadcasted by the first cell.

Step S308: Determining whether second system information is scheduled by the first cell according to content of the first system information. In an embodiment of the invention, the second system information may at least comprise SIB 24 broadcasted by the first cell, and the first cell will indicate whether SIB 24 is scheduled and when will SIB 24 be broadcast (if it is scheduled) in SIB 1. If yes, step S310 is performed. If not, step S320 is performed.

Step S310: Receiving the second system information based on determination of the second system information being scheduled by the first cell and deriving information regarding one or more cells of the second RAT based on the second system information. According to an embodiment of the invention, the first cell carries information (for example, the frequency, the cell identify, or others) regarding one or more cells, such as its neighbor cells or neighbor network nodes, of the second RAT in the second system information (e.g. the SIB 24) when the second system information is scheduled.

It should be noted in the first embodiment of the invention, although the first cell of the first RAT has been found in the corresponding cell search procedure, for example, in steps S302 and S304, the processor 222 may still temporarily suspend or delay an attempt to access the first cell. That is, in the first embodiment of the invention, instead of directly attempting to access the first cell based on a search result indicating that the first cell of the first RAT has been found in the corresponding cell search procedure, the processor 222 may first collect the second system information to derive the information regarding one or more cells of a second RAT. Therefore, in the first embodiment of the invention, the processor is configured to perform the operations of receiving the second system information and deriving the information regarding the second cell of the second RAT without attempting to access the first cell.

Step S312: Determining whether there is any cell that is indicated in the second system information and has not been searched in the cell search procedure for the second RAT. As described above, a cell search procedure for the second RAT may be performed before step S302. In the cell search procedure for the second RAT, the processor 222 may determine whether there is any cell of the second RAT exists around the current location of the communications apparatus 100 by searching some frequencies in the frequency bands supported by the communications apparatus 100 based on a selected frequency list. If yes is determined in step S312 (that is, based on determination of any cell has not been searched in the cell search procedure for the second RAT), step S314 is performed. If no is determined in step S312, step S320 is performed. It is to be noted that for simplicity, a second cell will be utilized in steps S314 and S316 to represent the one or more cells of the second RAT indicated by the first cell in the second system information and determined as have not been searched in the cell search procedure for the second RAT in step S312.

It is to be also noted that, in the embodiments of the invention, step S312 may be an optional step. That is, in some embodiments of the invention, the determination of step S312 may be inserted and performed after step S310, while in other embodiments of the invention, the determination of step S312 may be skipped. The processor 222 may be configured to directly perform step S314 after step S310. In the embodiments where step S312 is skipped, the second cell in steps S314 and S316 is utilized to represent the one or more cells of the second RAT indicated by the first cell in the second system information.

Step S314: Searching for the second cell of the second RAT according to the information regarding the second cell derived in step S310.

Step S316: Determining whether the second cell has been found according to the searching result in step S314. If yes, step S318 is performed. If not, that is, based on a search result indicating that the second cell of the second RAT has not been found in the search for the second cell of the second RAT, step S320 is performed.

Step S318: Attempting to access the second cell, instead of the first cell, when the second cell has been found.

Step S320: Attempting to access the first cell. When the attempt in step S318 or S320 is successful, the processor 222 shows the icon of the corresponding RAT on the UI of the communications apparatus 100 to indicate service availability from the corresponding RAT. On the other hand, when the attempt in step S318 or S320 has failed, the processor 222 may have another attempt to access another cell that has been found in the corresponding search procedure, or may perform another cell search procedure for another RAT, such as performing step S322.

Step S322: Performing a cell search procedure for a third RAT. In the embodiment of the invention, the third RAT may be a RAT different from the first RAT and the second RAT, and may be less preferred than the first RAT and the second RAT. For example, when the RAT preference of the communications apparatus 100 is set as 5G>4G>3G, the third RAT may be 3G.

According to an embodiment of the invention, the first cell of the first RAT is configured to provide access to a first core network and the second cell of the second RAT is configured to provide access to a second core network different from the first core network. In an embodiment of the invention, the first core network is an LTE core network or a 4G core network, and the second core network is a Next Generation-Radio Access Network (NG-RAN) or a 5G core network. It should be understood that when the communications apparatus 100 has the ability to directly access a cell which provides access to the NG-RAN or the 5G core network, the communications apparatus 100 operates in the standalone (SA) mode.

According to the first embodiment of the invention, the processor 222 is configured to perform the operations of receiving the second system information and deriving the information regarding one or more cells of the second RAT before attempting to access the first cell that has been found in the corresponding cell search procedure, for example, in steps S302 and S304. That is, in the first embodiment of the invention, Step S310 is performed after the first cell has been found and before an attempt to access the first cell is performed. In the first embodiment of the invention, the processor 222 may be configured to not attempt to access the first cell until determining that the second system information is not scheduled by the first cell.

In addition, when it is determined that the second cell has been found in step S316, the processor 222 is configured to perform the operation of attempting to access the second cell in step S318 before attempting to access the first cell. That is, in the first embodiment of the invention, after performing a cell search procedure for a first RAT and finding out the first cell of the first RAT, an attempt to access the second cell is performed before (that is, prior than) an attempt to access the first cell based on determination of information regarding the second cell is carried in the SIB 24 broadcasted by the first cell.

Therefore, in the first embodiment of the invention, priority inversion is avoided when the second cell has been found and the attempt of accessing the second cell is finally successful. That is, as long as the communications apparatus is in the coverage of a cell of the most or the more preferred RAT, even if the communications apparatus 100 has not learned about the information regarding that cell before and is unable to find out that cell in a corresponding cell search procedure, the communications apparatus 100 is still able to directly access the wireless network of the most or the more preferred RAT via that cell and get the wireless communications services from the wireless network of the most or the more preferred RAT, instead of the other lower priority or less preferred RAT, by applying the proposed network accessing method. Therefore, the RAT priority is not inversed.

In addition, in the conventional design, the attempt to access a first cell of the first RAT (e.g., step S320) is directly performed when the first cell has been found in the cell search procedure (e.g., step S302) for the first RAT, and it may take a long time for the communications apparatus to handover or reselect to the most or the more preferred RAT when the communications apparatus is also in the coverage of a neighbor cell of the most or the more preferred RAT. However, in the first embodiment of the invention, the attempt to access the first cell of the first RAT is suspended when it is determined that SIB 24 is scheduled by the first cell, and the processor is configured to perform the operations of receiving SIB 24 and deriving the information regarding the second cell of the second RAT without attempting to access the first cell. Therefore, as compared to the conventional design, it will be much faster for the communications apparatus 100 to access the wireless network of the most preferred or the more RAT and get the wireless communications services from the wireless network of the most or the more preferred RAT in the first embodiment of the invention by applying the proposed network accessing method. In addition, in the first embodiment of the invention, the amount of signaling transmitted between the communications apparatus 100 and the network devices in the wireless network is also much fewer than the conventional design, since the handover or cell reselection procedure is not performed.

It should be noted that although SIB 24 is illustrated in Step S308 as the neighbor network node information to be collected by the processor 222 to facilitate the network accessing, the invention should not be limited thereto. In other embodiments of the invention, the neighbor network node information that can be collected by the processor 222 and used to facilitate the network accessing may also comprise the Public land mobile network (PLMN) identity, location area code, tracking area code or cell identity, which may provide location information in SIB1, or the frequencies or bands for intra or inter RAT selection/reselection/measurement.

Figure 4:
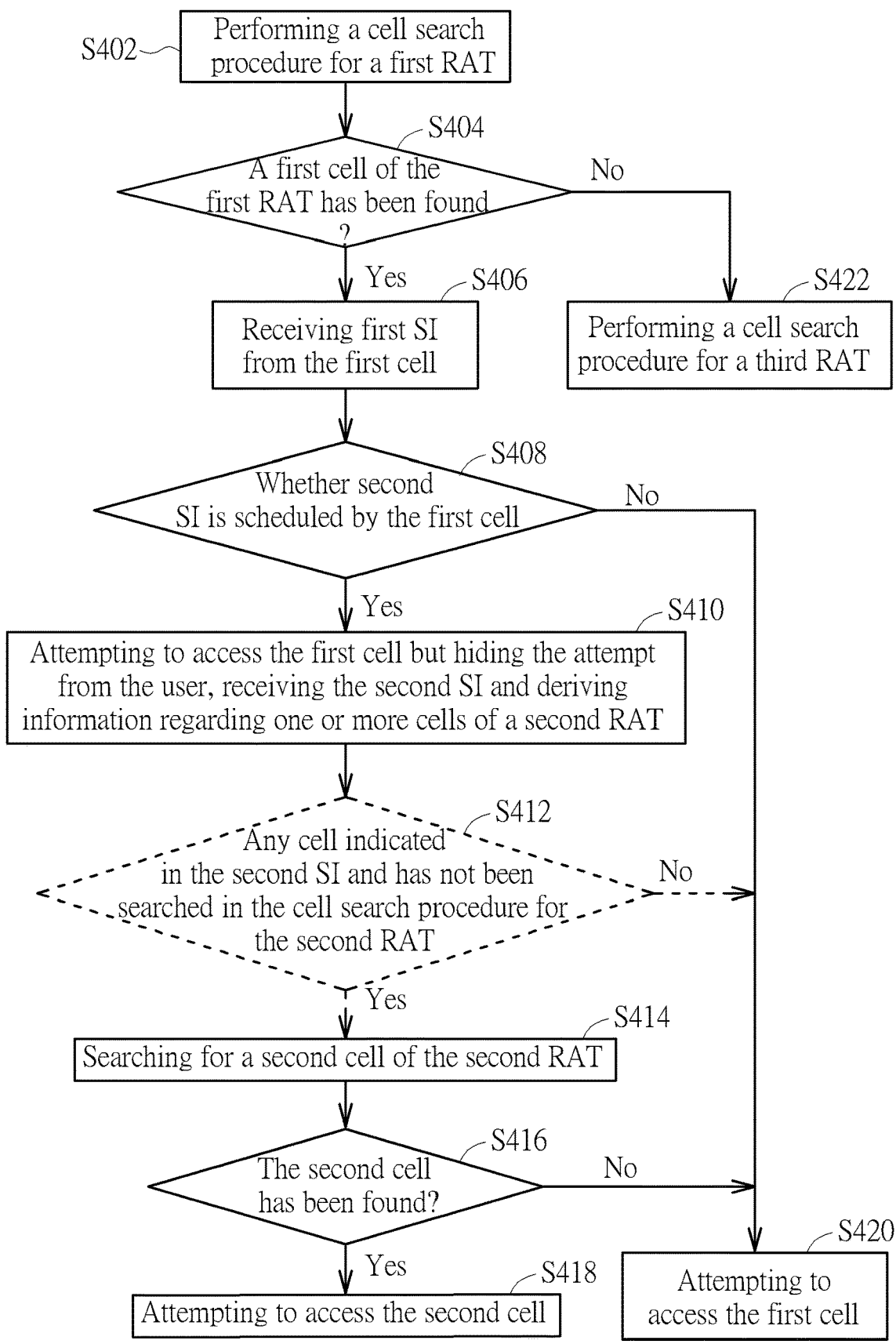
FIG. 4 illustrates an exemplary flow chart of a network accessing method according to a second embodiment of the invention.

FIG. 4 illustrates an exemplary flow chart of a network accessing method according to a second embodiment of the invention. Different from the first embodiment, in the second embodiment of the invention, the processor 222 is configured to perform the operations of receiving the second system information and deriving the information regarding one or more cells of the second RAT while attempting to access the first cell. The network accessing method may be performed by the processor 222 and may comprise the following steps:

Step S402: Performing a cell search procedure for a first RAT. As described above, the first RAT may be a RAT different from the most preferred RAT of the communications apparatus 100, or may be a less preferred RAT when there is a more preferred RAT. In addition, in the embodiment of the invention, before performing step S402, the processor 222 may be further configured to perform a cell search procedure for a second RAT, and step S402 will be performed when no cell of the second RAT has been found in the cell search procedure for the second RAT, where the second RAT may be a RAT that is different from the first RAT and more preferred than the first RAT.

Step S404: Determining whether a cell of the first RAT has been found in the cell search procedure for the first RAT. If no cell of the first RAT has been found, step S422 is performed. If any cell, for example, a first cell, of the first RAT has been found (that is, based on a search result indicating that a first cell has been found in the cell search procedure for the first RAT), step S406 is performed.

Step S406: Receiving first system information (SI) from the first cell of the first RAT. In an embodiment of the invention, the first system information may at least comprise System Information Block (SIB) 1 broadcasted by the first cell.

Step S408: Determining whether second system information is scheduled by the first cell according to content of the first system information. In an embodiment of the invention, the second system information may at least comprise SIB 24 broadcasted by the first cell, and the first cell will indicate whether SIB 24 is scheduled and when will SIB 24 be broadcast (if it is scheduled) in SIB 1. If yes, step S410 is performed. If not, step S420 is performed.

Step S410: Attempting to access the first cell, and during (or, after in some embodiments) the attempt to access the first cell, receiving the second system information based on determination of the second system information being scheduled by the first cell and deriving information regarding one or more cells of the second RAT based on the second system information. It is to be noted that, in the second embodiment of the invention, although the processor 222 is attempting to access the first cell in step S410, such information is hidden from the user. That is, the processor 222 will not show any information regarding the attempt to access a cell of the first RAT or show any icon of the first RAT for indicating service availability from the first RAT on the user interface (UI) of the communications apparatus 100.

Therefore, in the second embodiment of the invention, since the first cell of the first RAT has been found in the corresponding cell search procedure, for example, in steps S402 and S404, the processor 222 may start to do the attempt to access the first cell, but does not let the user to be aware of such attempt.

Step S412: Determining whether there is any cell that is indicated in the second system information and has not been searched in the cell search procedure for the second RAT. As described above, a cell search procedure for the second RAT may be performed before step S402. If yes (that is, based on determination of any cell has not been searched in the cell search procedure for the second RAT), step S414 is performed. If not, step S420 is performed. It is to be noted that for simplicity, a second cell will be utilized in steps S414 and S416 to represent the one or more cells of the second RAT indicated by the first cell in the second system information and determined as have not been searched in the cell search procedure for the second RAT in step S412.

It is to be also noted that, in the embodiments of the invention, step S412 may be an optional step. That is, in some embodiments of the invention, the determination of step S412 may be inserted and performed after step S410, while in other embodiments of the invention, the determination of step S412 may be skipped. The processor 222 may be configured to directly perform step S414 after step S410. In the embodiments where step S412 is skipped, the second cell in steps S414 and S416 is utilized to represent the one or more cells of the second RAT indicated by the first cell in the second system information.

Step S414: Searching for the second cell of the second RAT according to the information regarding the second cell derived in step S410.

Step S416: Determining whether the second cell has been found according to the searching result in step S414. If yes, step S418 is performed. If not, that is, based on a search result indicating that the second cell of the second RAT has not been found in the search for the second cell of the second RAT, step S420 is performed.

Step S418: Attempting to access the second cell, instead of the first cell, when the second cell has been found. In the second embodiment of the invention, when the second cell has been found, the procedure of accessing the first cell that has been started in step S410 will be stopped or suspended, or the attempt to access the first cell will be abandoned. That is, in the second embodiment of the invention, the processor may be configured to stop accessing the first cell based on the search result indicating that the second cell of the second RAT has been found in the search for the second cell of the second RAT. Therefore, when the second cell has been found, the processor 222 may give up the procedure of accessing the first cell and start to access the second cell instead.

Step S420: Attempting to access the first cell. When the attempt in step S418 or S420 is successful, the processor 222 shows the icon of the corresponding RAT on the UI of the communications apparatus 100 to indicate service availability from the corresponding RAT. Noted that if step S410 has been performed before entering step S420 (that is, the attempt to access the first cell has been performed before entering step S420), the processor 222 is configured to continuously perform the remaining procedure of accessing the first cell in step S420. On the other hand, when the attempt in step S418 or S420 has failed, the processor 222 may have another attempt to access another cell that has been found in the corresponding search procedure, or may perform another cell search procedure for another RAT, such as performing step S422.

Step S422: Performing a cell search procedure for a third RAT. In the embodiment of the invention, the third RAT may be a RAT different from the first RAT and the second RAT, and may be less preferred than the first RAT and the second RAT. For example, when the RAT preference of the communications apparatus 100 is set as 5G>4G>3G, the first RAT may be 4G, the second RAT may be 5G and the third RAT may be 3G.

According to an embodiment of the invention, the first cell of the first RAT is configured to provide access to a first core network and the second cell of the second RAT is configured to provide access to a second core network different from the first core network. In an embodiment of the invention, the first core network is an LTE core network or a 4G core network, and the second core network is a Next Generation-Radio Access Network (NG-RAN) or a 5G core network. It should be understood that when the communications apparatus 100 has the ability to directly access a cell which provides access to the NG-RAN or the 5G core network, the communications apparatus 100 operates in the standalone (SA) mode.

According to the second embodiment of the invention, the processor 222 may be configured to perform the operations of receiving the second system information and deriving the information regarding one or more cells of the second RAT while attempting to access the first cell that has been found in the corresponding cell search procedure but hiding the attempt from user.

In addition, when it is determined that the second cell has been found in step S416, the processor 222 is configured to directly perform the operation of attempting to access the second cell in step S418. Therefore, in the second embodiment of the invention, priority inversion is also avoided when the second cell has been found and the attempt of accessing the second cell is successful. That is, in the second embodiment of the invention, as long as the communications apparatus is in the coverage of a cell of the most or the more preferred RAT, even if the communications apparatus 100 has not learned about the information regarding that cell before and is unable to find out that cell in a corresponding cell search procedure, the communications apparatus 100 is still able to access the wireless network of the most or the more preferred RAT via that cell and get the wireless communications services from the wireless network of the most or the more preferred RAT, instead of the other lower priority or less preferred RAT by applying the proposed network accessing method. Therefore, the RAT priority is not inversed.

In addition, as compared to the conventional design, it will also be much faster for the communications apparatus 100 to access the wireless network of the most or the more preferred RAT and get the wireless communications services from the wireless network of the most or the more preferred RAT in the second embodiment of the invention. In addition, in the second embodiment of the invention, the amount of signaling transmitted between the communications apparatus 100 and the network devices in the wireless network is also much fewer than the conventional design, since the handover or cell reselection procedure is not performed.

It should be noted that although SIB 24 is illustrated in Step S408 as the neighbor network node information to be collected by the processor 222 to facilitate the network accessing, the invention should not be limited thereto. In other embodiments of the invention, the neighbor network node information that can be collected by the processor 222 and used to facilitate the network accessing may also comprise the PLMN identity, location area code, tracking area code or cell identity which may provide location information in SIB1, or the frequencies or bands for intra or inter RAT selection/reselection/measurement.

Different from the second embodiment as described above, according to a third embodiment of the invention, the processor 222 will not hide the information regarding the attempt to access a cell of the first RAT. That is, in the third embodiment of the invention, while the processor 222 is attempting to access the first cell such as in step S410, information regarding the attempt will not be hidden from the user. In the third embodiment of the invention, the processor 222 will still show the information regarding the attempt to access a cell of the first RAT or show the icon of the first RAT indicating service availability from the first RAT on the UI of the communications apparatus 100.

According to the embodiments of the invention, the processor 222 is further configured to maintain a preferred cell database recording information regarding one or more cells of one or more RATs (for example, at least the most preferred RAT) that have been learned or found by the communications apparatus 100 and/or the processor 222 before, and the processor 222 is configured perform the cell search procedure for the corresponding RAT according to the corresponding preferred cell database. For example, as described above, prior to or before the cell search procedure as illustrated in step S302 and S402, the cell search procedure of a more preferred RAT may be performed according to the corresponding preferred cell database. In the embodiments of the invention, the information recorded in the preferred cell database may comprise one or more of the frequency, cell identity, PLMN identity, location area code, tracking area code, or others, of the corresponding cells.

In addition, in some embodiments of the invention, the processor 222 may also select one or more frequencies, which may be not recorded in the preferred cell database, to be searched in a cell search procedure based on a predetermined rule and according to the corresponding preferred cell database to generate a selected frequency list, and perform the cell search procedure according to the selected frequency list with the corresponding preferred cell database. For example, in some embodiments of the invention, the predetermined rule may be that selecting one or more frequencies around or adjacent to the frequencies recorded in the corresponding preferred cell database.

In addition, in some embodiments of the invention, the processor 222 may also record information regarding the one or more cells obtained in Step S310 and/or S410 in the corresponding preferred cell database. In this manner, more and more useful cell information will be recorded in the corresponding preferred cell database.

In summary, in the embodiments of the invention, the communications apparatus may be configured to collect neighbor network node information of a more preferred RAT on the network node of a less preferred RAT and registration procedure on the less preferred RAT (or, camping on procedure or access procedure of the less preferred RAT) may be delayed, suspended, or hidden from the user if any information indicates that a neighbor network node of the more preferred RAT may exist. In this manner, a direct network node selection procedure to select to the more preferred RAT may be initiated immediately before a reselection procedure is started. By applying the proposed network accessing methods, user experience is greatly improved as compared to the conventional design by selecting the most or the more preferred RAT first. In addition, the time required to get a normal service on the most or the more preferred RAT is shorter than the reselection/handover procedure, and unnecessary signaling procedures on a less preferred RAT is also avoided for both the communications apparatus 100 and network device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications apparatus, comprising:
   a radio transceiver, transmitting or receiving wireless signals in a wireless network; and
   a processor, coupled to the radio transceiver and configured to perform operations comprising:
   performing a cell search procedure for a first Radio Access Technology (RAT) in the wireless network;
   receiving first system information from a first cell of the first RAT based on a search result indicating that the first cell has been found in the cell search procedure for the first RAT;
   determining whether second system information is scheduled by the first cell according to content of the first system information;
   receiving the second system information based on determination of the second system information being scheduled by the first cell and deriving information regarding a second cell of a second RAT different from the first RAT based on the second system information;
   searching for the second cell of the second RAT according to the information regarding the second cell of the second RAT; and
   attempting to access the second cell instead of the first cell based on a search result indicating that the second cell of the second RAT has been found in the search for the second cell of the second RAT,
   wherein the first cell is configured to provide access to a first core network and the second cell is configured to provide access to a second core network different from the first core network.

2. The communications apparatus of claim 1, wherein the processor is further configured to perform the operations comprising:
   not attempting to access the first cell until determining that the second system information is not scheduled by the first cell.

3. The communications apparatus of claim 1, wherein the processor is configured to perform the operations of receiving the second system information and deriving the information regarding the second cell of the second RAT without attempting to access the first cell.

4. The communications apparatus of claim 3, wherein the processor is further configured to perform operations comprising:
   attempting to access the first cell based on a search result indicating that the second cell of the second RAT has not been found in the search for the second cell of the second RAT.

5. The communications apparatus of claim 1, wherein the processor is configured to perform the operations of receiving the second system information and deriving the information regarding the second cell of the second RAT while attempting to access the first cell but hiding the attempt from user.

6. The communications apparatus of claim 5, wherein the processor is further configured to perform operations comprising:
   stopping accessing the first cell based on the search result indicating that the second cell of the second RAT has been found in the search for the second cell of the second RAT.

7. The communications apparatus of claim 1, wherein the processor is further configured to perform operations comprising:
   performing a cell search procedure for the second RAT in the wireless network before performing the cell search procedure for the first RAT, wherein the cell search procedure for the first RAT is performed when no cell of the second RAT has been found in the cell search procedure for the second RAT; and
   determining whether the second cell has been searched in the cell search procedure for the second RAT after deriving the information regarding the second cell of the second RAT based on the second system information.

8. The communications apparatus of claim 7, wherein the processor is configured to search for the second cell of the second RAT according to the information regarding the second cell of the second RAT based on determination of the second cell has not been searched in the cell search procedure for the second RAT.

9. The communications apparatus of claim 7, wherein the processor is further configured to perform operations comprising:
attempting to access the first cell based on determination of the second cell has been searched in the cell search procedure for the second RAT.

10. The communications apparatus of claim 1, wherein the second system information comprises System Information Block (SIB) 24 broadcasted by the first cell.

11. A network accessing method, comprising:
performing a cell search procedure for a first Radio Access Technology (RAT);
receiving first system information from a first cell of the first RAT based on a search result indicating that the first cell has been found in the cell search procedure for the first RAT;
determining whether second system information is scheduled by the first cell according to content of the first system information;
receiving the second system information based on determination of the second system information being scheduled by the first cell and deriving information regarding a second cell of a second RAT different from the first RAT based on the second system information;
searching for the second cell of the second RAT according to the information regarding the second cell of the second RAT; and
attempting to access the second cell instead of the first cell based on a search result indicating that the second cell of the second RAT has been found in the search for the second cell of the second RAT,
wherein the first cell is configured to provide access to a first core network and the second cell is configured to provide access to a second core network different from the first core network.

12. The network accessing method of claim 11, further comprising:
not attempting to access the first cell until determining that the second system information is not scheduled by the first cell.

13. The network accessing method of claim 11, wherein step of receiving the second system information based on determination of the second system information being scheduled by the first cell and deriving the information regarding the second cell of the second RAT different from the first RAT based on the second system information is performed without an attempt to access the first cell.

14. The network accessing method of claim 13, further comprising:
attempting to access the first cell based on a search result indicating that the second cell of the second RAT has not been found in the search for the second cell of the second RAT.

15. The network accessing method of claim 11, wherein step of receiving the second system information based on determination of the second system information being scheduled by the first cell and deriving the information regarding the second cell of the second RAT different from the first RAT based on the second system information is performed while attempting to access the first cell but hiding the attempt from user.

16. The network accessing method of claim 15, further comprising:
stopping accessing the first cell based on the search result indicating that the second cell of the second RAT has been found in the search for the second cell of the second RAT.

17. The network accessing method of claim 11, further comprising
performing a cell search procedure for the second RAT before performing the cell search procedure for the first RAT, wherein step of performing the cell search procedure for the first RAT is performed when no cell of the second RAT has been found in the cell search procedure for the second RAT; and
determining whether the second cell has been searched in the cell search procedure for the second RAT after the information regarding the second cell of the second RAT has been derived based on the second system information.

18. The network accessing method of claim 17, further comprising:
searching for the second cell of the second RAT according to the information regarding the second cell of the second RAT based on determination of the second cell has not been searched in the cell search procedure for the second RAT.

19. The network accessing method of claim 17, further comprising:
attempting to access the first cell based on determination of the second cell has been searched in the cell search procedure for the second RAT.

20. The network accessing method of claim 11, wherein the second system information comprises System Information Block (SIB) 24 broadcasted by the first cell.

* * * * *